(12) United States Patent
Tebeka et al.

(10) Patent No.: US 12,348,398 B2
(45) Date of Patent: Jul. 1, 2025

(54) HARDWARE BASED COLLECTIVE OPERATIONS PROFILING

(71) Applicant: MELLANOX TECHNOLOGIES, LTD., Yokneam (IL)

(72) Inventors: Jacob Yaki Tebeka, Kfar Monash (IL); Itamar Rabenstein, Petach-Tiqwa (IL); Aviv Avraham Paxton, Petah Tikva (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 8 days.

(21) Appl. No.: 18/231,065

(22) Filed: Aug. 7, 2023

(65) Prior Publication Data
US 2025/0055781 A1    Feb. 13, 2025

(51) Int. Cl.
*H04L 43/106* (2022.01)

(52) U.S. Cl.
CPC .................. *H04L 43/106* (2013.01)

(58) Field of Classification Search
CPC ...................................... H04L 43/106
See application file for complete search history.

(56) References Cited

U.S. PATENT DOCUMENTS

| | | | |
|---|---|---|---|
| 10,659,328 B2 * | 5/2020 | Sundaram | G06F 16/1744 |
| 2010/0125661 A1 * | 5/2010 | Perala | H04L 43/106 709/224 |
| 2019/0089616 A1 * | 3/2019 | Chabbi | G06F 11/3476 |
| 2019/0221187 A1 * | 7/2019 | Dutt | H04L 41/0886 |
| 2022/0045927 A1 * | 2/2022 | Liu | H04L 43/062 |
| 2022/0269424 A1 * | 8/2022 | Horev | G06F 9/5088 |

OTHER PUBLICATIONS

El-Shamy et al. "Anomaly Detection and Bottleneck Identification of The Distributed Application in Cloud Data Center using Software-Defined Networking", https://www.sciencedirect.com/science/article/pii/S1110866521000013 (Year: 2021).*

"NVIDIA Scalable Hierarchical Aggregation and Reduction Protocol (SHARP) Rev 3.0.0," NVIDIA Corporation, 2023, 3 pages [retrieved online Nov. 22, 2023 from: docs.nvidia.com/networking/display/sharpv300].

* cited by examiner

*Primary Examiner* — James E Springer
*Assistant Examiner* — Patrick F Ngankam
(74) *Attorney, Agent, or Firm* — Sheridan Ross P.C.

(57) ABSTRACT

A system includes one or more processors to trace one or more packets transmitted by an application distributed among a plurality of computing nodes. The one or more processors are to generate tracing data based at least in part on tracing the one or more packets. The tracing data includes temporal information associated with transmission of the one or more packets. The one or more processors are to manage a data allocation associated with the application based on the tracing data.

20 Claims, 5 Drawing Sheets

HARDWARE BASED COLLECTIVE OPERATIONS PROFILING

FIELD OF TECHNOLOGY

The present disclosure relates to collective operations used in distributed applications, and more particularly, to hardware based profiling of collective operations.

BACKGROUND

Some applications may be distributed over multiple computing nodes. Collective operations may be used in distributed applications to pass data between the computing nodes. Improved techniques for mitigating wait times associated with the collective operation are desired.

SUMMARY

The techniques described herein relate to a system including one or more processors to: trace one or more packets transmitted by an application distributed among a plurality of computing nodes; generate tracing data based at least in part on tracing the one or more packets, wherein the tracing data includes temporal information associated with transmission of the one or more packets; and manage a data allocation associated with the application based at least in part on the tracing data.

In some aspects, the one or more processors are further to generate profile data associated with the application based at least in part on the tracing data, wherein managing the data allocation is based at least in part on the profile data.

In some aspects, the temporal information includes collective temporal information associated with the application, wherein the collective temporal information is based at least in part on: respective first packets transmitted by the plurality of computing nodes in association with the application; and respective last packets transmitted by the plurality of computing nodes in association with the application.

In some aspects, the one or more processors are further to display profile data associated with the application via a graphical interface, wherein displaying the profile data includes displaying: identification information corresponding to one or more computing nodes of the plurality of computing nodes; and a graphical representation corresponding to the temporal information associated with the transmission of the one or more packets.

In some aspects, managing the data allocation includes increasing, reducing, or maintaining an amount of data for processing by one or more computing nodes of the plurality of computing nodes in association with the application, based at least in part on the tracing data.

In some aspects, the temporal information includes first temporal information associated with transmission of one or more packets by a first computing node of the plurality of computing nodes and second temporal information associated with transmission of one or more second packets by at least one second computing node of the plurality of computing nodes; managing the data allocation includes reducing an amount of data for processing by the first computing node of the plurality of computing nodes in association with the application, based at least in part on a comparison of the first temporal information and the second temporal information.

In some aspects, the one or more packets include: a first packet transmitted by one or more computing nodes of the plurality of computing nodes in association with a primitive operation, wherein the primitive operation is included among a set of primitive operations associated with the application; and a last packet transmitted by the one or more computing nodes in association with the primitive operation.

In some aspects, the tracing data includes an indication of a primitive operation associated with the one or more packets; and the primitive operation is included among a set of primitive operations associated with the application.

In some aspects, the tracing data includes identification information associated with one or more computing nodes of the plurality of computing nodes.

In some aspects, the one or more processors are to further perform a collective operation in association with the application.

In some aspects, the application trains a machine learning network.

In some aspects, the temporal information includes: a first temporal instance associated with a first packet transmitted by one or more computing nodes of the plurality of computing nodes; and a second temporal instance associated with a second packet transmitted by the one or more computing nodes, wherein the first packet and the second packet are included in the one or more packets.

The techniques described herein relate to a distributed computing system including: a switching device in communication with a plurality of computing nodes, wherein the switching device is to: trace one or more packets transmitted by an application distributed among the plurality of computing nodes; generate tracing data based at least in part on tracing the one or more packets, wherein the tracing data includes temporal information associated with transmission of the one or more packets; and manage a data allocation associated with the application based at least in part on the tracing data.

In some aspects, managing the data allocation is based at least in part on profile data associated with the application, wherein the profile data is generated based at least in part on the tracing data.

In some aspects, the temporal information includes collective temporal information associated with the application, wherein the collective temporal information is based at least in part on: respective first packets transmitted by the plurality of computing nodes in association with the application; and respective last packets transmitted by the plurality of computing nodes in association with the application.

In some aspects, managing the data allocation includes increasing, reducing, or maintaining an amount of data for processing by one or more computing nodes of the plurality of computing nodes in association with the application, based at least in part on the tracing data.

In some aspects, the one or more packets include: a first packet transmitted by one or more computing nodes of the plurality of computing nodes in association with a primitive operation, wherein the primitive operation is included among a set of primitive operations associated with the application; and a last packet transmitted by the one or more computing nodes in association with the primitive operation.

In some aspects, the techniques described herein relate to a distributed computing system, wherein: the tracing data includes an indication of a primitive operation associated with the one or more packets; and the primitive operation is included among a set of primitive operations associated with the application.

In some aspects, the tracing data includes identification information associated with one or more computing nodes of the plurality of computing nodes.

In some aspects, the techniques described herein relate to a device including: one or more processors to: trace, one or more packets transmitted by an application distributed among a plurality of computing nodes; generate tracing data based at least in part on tracing the one or more packets, wherein the tracing data includes temporal information associated with transmission of the one or more packets; and manage a data allocation associated with the application based at least in part on the tracing data.

DETAILED DESCRIPTION

Figure 1:
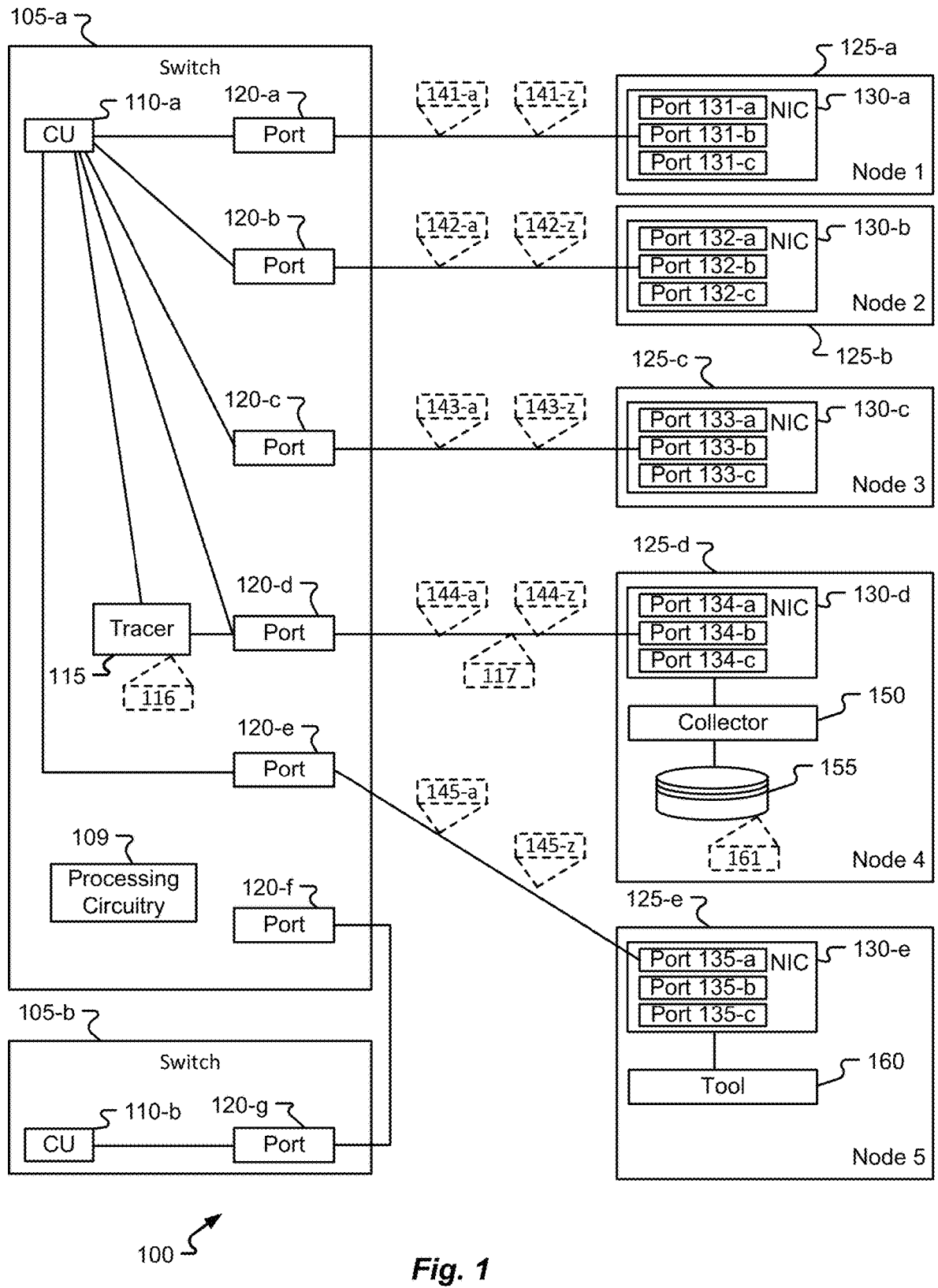
FIG. 1 illustrates an example of a system in accordance with aspects of the present disclosure.

The ensuing description provides example aspects of the present disclosure, and is not intended to limit the scope, applicability, or configuration of the claims. Rather, the ensuing description will provide those skilled in the art with an enabling description for implementing the described examples. It being understood that various changes may be made in the function and arrangement of elements without departing from the spirit and scope of the appended claims. Various aspects of the present disclosure will be described herein with reference to drawings that are schematic illustrations of idealized configurations.

Distributed applications (e.g., neural-networks training) may be run over multiple nodes. Collective operations (e.g., AllReduce) may be used in distributed applications to pass data between the nodes. In some cases, when one or more nodes are late to send their respective data, all other nodes participating in the collective operation wait, resulting in a "long tail problem."

The "late nodes" (which are late to send their respective data) act as a bottleneck, significantly impacting the overall training time and efficiency of distributed neural network training. The delayed sending of data by the late nodes reduces the overall utilization of computing resources (e.g., due to idle time for the faster nodes). In some cases, the overall wait cost associated with the delayed sending of data is equal to the delay multiplied by the quantity of nodes waiting. Techniques are desired for identifying which nodes are late for the collective operations.

According to example aspects of the present disclosure, systems and techniques are described that support running a distributed application over multiple nodes, in which the nodes are connected via a hierarchy of network switching devices.

The switching devices may support scalable hierarchical aggregation protocol (SHArP)™, applied for hardware based collective operation acceleration and decreasing the latency of reduction operations. SHARP™ technology supports hardware acceleration for collective operations. For example, SHARP™ provides performance improvements of MPI and machine learning collective operation, by offloading collective operations from CPUs and GPUs to the network and mitigating implementations in which the same data is sent multiple times between endpoints. MPI includes a variant of the reduce operations, in which the result is returned to all processes in a group. In some cases, in MPI, all processes from the same group participating in collective operations receive identical results.

Some communication libraries (e.g., NVIDIA Collective Communications Library (NCCL), unified collective communication (UCC)), are used by distributed applications to optimize the performance of collective primitives performance. NCCL and UCC use SHARP.

In some aspects, the switching devices are each equipped with a calculation logical unit (CLU) (also referred to herein as calculation unit (CU)). The CLU may perform calculations related to collective operations (e.g., maximum, average, etc.) associated with SHARP. The CLU includes a tracer that can trace communication packets that pass through the CLU. For example, the tracer is capable of tracing SHARP related packets.

Aspects of the techniques described herein include using the tracer to trace, at the switch level, the first and last packets sent by each node (e.g., at one or more network ports in each node, at each network port in each node, etc.) for each collective operation. In an example, a node may have multiple GPUs participating in a collective operation, in which each GPU is in communication with the node via a network port of the node.

Each switching device participating in a collective operation may transmit traced data to a collector. In some aspects, the collector may be implemented by a software package executed by one or more processors on a network node.

A system-wide performance analysis tool (e.g., NVIDIA Nsight Systems) may read the traced data from the collector (or a database). The tool may determine, from the traced data, the "late nodes" and the "late network ports" (also referred to herein as "late node ports") of the "late nodes."

The techniques described herein include providing a user interface displaying a collective operation timing, using which a developer may identify and profile the "late nodes" and the "late network ports" to optimize the performance of the distributed application. Example aspects of the user interface are later described herein.

Aspects of the disclosure are further illustrated by and described with reference to apparatus diagrams, system diagrams, and flowcharts herein.

FIG. 1 illustrates an example of system 100 in accordance with aspects of the present disclosure. The system 100 may include switching devices 105 (e.g., switching device 105-*a*, switching device 105-*b*) and computing nodes 125 (e.g., computing node 125-*a* through computing node 125-*d*). The system 100 can be used in various applications, such as in server farms, campus or industrial computation systems, storage systems, data center systems and the like.

The system 100 may be a distributed computing system supportive of running distributed applications on multiple computing nodes 125. Distributed applications are applications or software that run on multiple computing devices within a network at the same time and, in some cases, can be stored on servers or cloud computing platforms. In some aspects, the system 100 may be referred to as a distributed computing network.

The system 100 may support communication among components (e.g., switching devices 105, computing nodes 125, etc.) of the system 100 using any suitable type of communication network and related protocols. Examples of the communications network may include any type of known communication medium or collection of communication media and may use any type of protocols to transport messages, signals, and/or data between endpoints. In some aspects, the communication network may include wired communications technologies, wireless communications technologies, or any combination thereof.

The Internet is an example of a communication network supported by the system 100, and the communication network may constitute an Internet Protocol (IP) network consisting of multiple computers, computing networks, and other devices (e.g., switching devices 105, computing nodes 125, etc.) located in multiple locations. Other examples of networks supported by the system 100 may include, without limitation, a standard Plain Old Telephone System (POTS), an Integrated Services Digital Network (ISDN), the Public Switched Telephone Network (PSTN), a Local Area Network (LAN), a Wide Area Network (WAN), a wireless LAN (WLAN), a Session Initiation Protocol (SIP) network, a Voice over Internet Protocol (VOIP) network, IP (e.g., with TCP as the transport protocol), Ethernet, InfiniBand™, a cellular network, and any other type of packet-switched or circuit-switched network known in the art. In some cases, the system 100 may include any combination of networks or network types. In some aspects, the networks may include any combination of communication mediums such as coaxial cable, copper cable/wire, fiber-optic cable, or antennas for communicating data (e.g., transmitting/receiving data). The communication network may be capable of delivering information at any suitable data rate.

The switching devices 105 may be top of rack (TOR) switches. In some aspects, the switching devices 105 may be TOR switches capable of handling operations for racks of servers (e.g., racks of computing nodes 125 described herein) connected to the TOR switches. Non-limiting examples of operations which may be handled by the switching devices 105 include Layer 2 and Layer 3 frame and packet forwarding, data center bridging, and the transport of Fiber Channel frames over Ethernet.

The switching devices 105 may be, for example, NVIDIA Quantum InfiniBand switches capable of providing high-bandwidth performance, low power, and scalability. The terms "switching device," "switch device," and "switch" may be used interchangeably herein.

Each switching device 105 is equipped with a CU 110 capable of performing calculations related to collective operations (e.g., maximum, average, etc.) associated with SHARP. Each CU 110 may include a tracer 115 capable of tracing communication packets (e.g., packets 141, packets 142, packets 143, packets 144, packets 145, etc. later described herein) that pass through the CU 110. The communication packets may be, for example, SHARP related packets. The terms "communication packets," "data packets," "network packets," and "packets" may be used interchangeably herein.

Each switching device 105 (e.g., switching device 105-a, etc.) may include processing circuitry 109. Processing circuitry 109 may perform one or more functions of the switching device 105 described herein. In some non-limiting examples, the processing circuitry 109 may perform at least one or more of the following functions: tracing one or more packets transmitted by an application distributed among computing nodes 125, generating tracing data based on tracing the one or more packets, and managing a data allocation associated with the application based on the tracing data.

Computing nodes 125 may be capable of computing operations described herein. For example, computing nodes 125 may support collective operations described herein. Computing nodes 125 may be implemented by a server (also referred to herein as a server device). The terms "node," "network node," and "computing node" may be used interchangeably herein.

Each computing node 125 may include a network interface controller (NIC) 130, also referred to herein as a network adapter. In some embodiments, each NIC 130 may include multiple ports (e.g., NIC 130-a may include ports 131, NIC 130-b may include ports 132, etc.). The ports may serve as a physical and electrical interface to the network.

Referring to FIG. 1, switching device 105-a is electrically coupled to computing nodes 125 via ports 120 (e.g., port 120-a through port 120-e) of the switching device 105-a and ports of the computing nodes 125 (e.g., ports of respective NICs 130). For example, switching device 105-a is electrically coupled to computing node 125-a via port 120-a and port 131-b, electrically coupled to computing node 125-b via port 120-b and port 132-b, electrically coupled to computing node 125-c via port 120-c and port 133-b, electrically coupled to computing node 125-d via port 120-d and port 134-b, and electrically coupled to computing node 125-e via port 120-e and port 135-a.

Example aspects of the present disclosure are described with reference to an application (distributed application) that is distributed among computing nodes 125 (e.g., computing node 125-a, computing node 125-b, etc.). It is to be understood that the example described herein may support implementations in which the application is distributed among a larger quantity of computing nodes 125 compared to the computing nodes 125 illustrated in FIG. 1.

In some aspects, the system 100 may support performing a collective operation in association with an application distributed among computing nodes 125 (e.g., computing node 125-a through computing node 125-e). In some aspects, the application distributed among computing nodes 125 may support the training of a machine learning network (e.g., a deep neural network, etc.). The collective operation may support passing data between the computing nodes 125. In an example, the collective operation may be an AllReduce application. The terms "application" and "distributed application" may be used interchangeably herein.

In an example, computing nodes 125 may transmit packets to switching device 105-a. For example, computing node 125-a may transmit packets 141 (e.g., packet 141-a through packet 141-z) to switching device 105-a via a port 131-b, computing node 125-b may transmit packets 142 (e.g., packet 142-a through packet 142-z) to switching device 105-a via port 132-b, and the like. The packets (e.g., packets 141, packets 142, packets 143, packets 144, packets 145, etc.) transmitted by the plurality of computing nodes 125 may include data associated with the application distributed among computing nodes 125. As described herein referring to the transmission of packets to switching device 105-a by the application may refer to the transmission of packets to switching device 105-a by the computing nodes 125 among which the application is distributed.

The system 100 may support performing the collective primitive operation, for example, by performing calculations inside the switching device 105-a (or inside multiple switching devices 105) and sending packets through the switch hierarchy. In an example, referring to FIG. 1, CU 110-a receives the packets (e.g., packets 141, packets 142, packets 143, packets 144, packets 145, etc.) from the plurality of computing nodes 125 and performs the collective primitive operation.

The system 100 may support tracing the packets transmitted to the switching device 105-a by the application. For example, the packets are transmitted by computing nodes 125 associated with the application. In an example, tracer 115 may generate tracing data 116 based on tracing the packets (e.g., packets 141, packets 142, packets 143, packets 144, packets 145, etc.). In some aspects, the tracing data 116 includes temporal information associated with transmission of the packets. For example, the tracing data 116 may include time stamps corresponding to the transmission of one or more packets (e.g., respective first and last packets) sent by each of the computing nodes 125. Additionally, or alternatively, the time stamps may correspond to when the one or more packets are received at the switching device 105-a.

In some aspects, the tracing data 116 includes identification information associated with the computing nodes 125 which provided the packets to the switching device 105-a. In some other aspects, the tracing data 116 includes an indication of a primitive operation associated with one or more packets (e.g., one or more of packet(s) 141, packet(s) 142, packet(s) 143, packet(s) 144, packet(s) 145, etc.). The primitive operation is included among a set of primitive operations associated with a distributed application described herein.

The temporal information included in the tracing data 116 may include collective temporal information associated with the application. For example, the collective temporal information may include temporal information corresponding to respective first packets (e.g., packet 141-a, packet 142-a, packet 143-a, etc.) transmitted by ports of the computing nodes 125 in association with the application and respective last packets (e.g., packet 141-z, packet 142-z, packet 143-z, etc.) transmitted by the ports of the computing nodes 125 in association with the application.

In a non-limiting example, with respect to packets 141 transmitted to the switching device 105-a from a port 131-b of computing node 125-a, the collective temporal information may include a first temporal instance corresponding to receipt of packet 141-a (e.g., first packet) at the switching device 105-a, a second temporal instance corresponding to receipt of packet 141-z (e.g., a last packet) at the switching device 105-a, and a temporal duration corresponding to the first temporal instance and the second temporal instance. In another non-limiting example, with respect to packets 142 transmitted to the switching device 105-a from a port 132-b of computing node 125-b, the collective temporal information may include a first temporal instance corresponding to receipt of packet 142-a (e.g., first packet) at the switching device 105-a, a second temporal instance corresponding to receipt of packet 142-z (e.g., a last packet) at the switching device 105-a, and a temporal duration corresponding to the first temporal instance and the second temporal instance.

Tracer 115 may identify the collective primitive packets. The switching device 105-a (e.g., tracer 115) may provide data 117 to collector 150. The data 117 may include the tracing data 116 (or a portion thereof). In an example, the data 117 may include the temporal information described herein (e.g., temporal information of first and last packets received at the switching devices 105-a from ports of each of computing nodes 125).

In some aspects, the data 117 may include identification information corresponding to the operation(s) associated with the packets. For example, the data 117 may include an indication of the computing nodes 125 (sending nodes). That is, for example, tracer 115 may identify the collective primitive packets and may transmit (in the data 117) the time stamps of the first and last packets of each collective primitive, in combination with information identifying the operations and the sending nodes, to collector 150.

The collector 150 may store the data 117 at database 155. The database 155 may be configured to provide or store any suitable data described herein, and the data may be accessed from the database 155 by the switching devices 105, computing nodes 125, or to any other device of the system 100 or external to the system 100, whether directly or via a suitable communication network. In some aspects, the collector 150 and the database 155 may be implemented at the same computing node 125 (e.g., computing node 125-d). Additionally, or alternatively, the database 155 may be implemented at a different computing nodes 125 or stand-alone from the computing nodes 125.

The system 100 may support one or more profiling sessions capable of generating profile data 161 associated with the application, based on the tracing data 116. In some aspects, the tool 160 may generate the profile data 161 from the data 117 and store the profile data 161 to database 155. In some aspects, the system 100 may autonomously and/or semi-autonomously (e.g., in combination with a user input) generate the profile data 161.

In an example, the tool 160 may read the data 117 stored in the database 155, to build the profile data 161. The profile data 161 may include collective operation timing. In an example, the tool 160 may generate a graphical representation (also referred to herein as a view) of the collective operation timing, and the computing node 125-e (or a computing device including a display device) may display the graphical representation to the user (e.g., a developer).

In some aspects, based on the collective operation timing, the user may profile the distributed application. For example, from the collective operation timing displayed in the graphical representation, the user may identify the "late nodes" among computing nodes 125. The user may profile the "late nodes" to identify and address any delay causes associated with the "late nodes." In an example, in addressing the delay causes, the user may optimize performance of the distributed application. According to example aspects of the present disclosure, in response to optimization of the distributed application by the user, the system 100 may repeat the operations described herein (e.g., in response to a user request) in association with generating and displaying an updated graphical representation.

The graphical representation may be, for example, a timing plot, a Gantt chart, a plot including statistical information, or any suitable representation of the data 117 and/or profile data 161 described herein. Example aspects of the graphical representation and an updated graphical representation are later illustrated at FIGS. 3A and 3B, respectively.

According to example aspects of the present disclosure, the systems and techniques described herein may support managing a data allocation associated with the application based on the tracing data 116, the data 117, the profile data 161, and/or a user input.

In an example of managing the data allocation, the system 100 (e.g., at processing circuitry and/or control circuitry included in switching device 105-a) may increase, reduce, or maintain respective amounts of data to be processed by the computing nodes 125 in association with the application, based on the tracing data 116, the data 117, and/or the profile data 161. For example, the switching device 105-a may process the tracing data 116, the data 117, and/or the profile data 161, based on which the switching device 105-a may identify one or more "late nodes." The switching device 105-a may balance the workload between the computing nodes 125, allocating data associated with the distributed application such that the "late nodes" will receive less work and will not be late in further iterations.

In an example, in response to processing the tracing data 116, the data 117, and/or the profile data 161, the switching device 105-a may identify that the latest packet received at the switching device 105-a with respect to a distributed application is packet 145-z. The switching device 105-a may identify computing node 125-e as the "late node." The switching device 105-a may balance the workload between the computing nodes 125, allocating a reduced amount of work associated with the distributed application.

Figure 2:
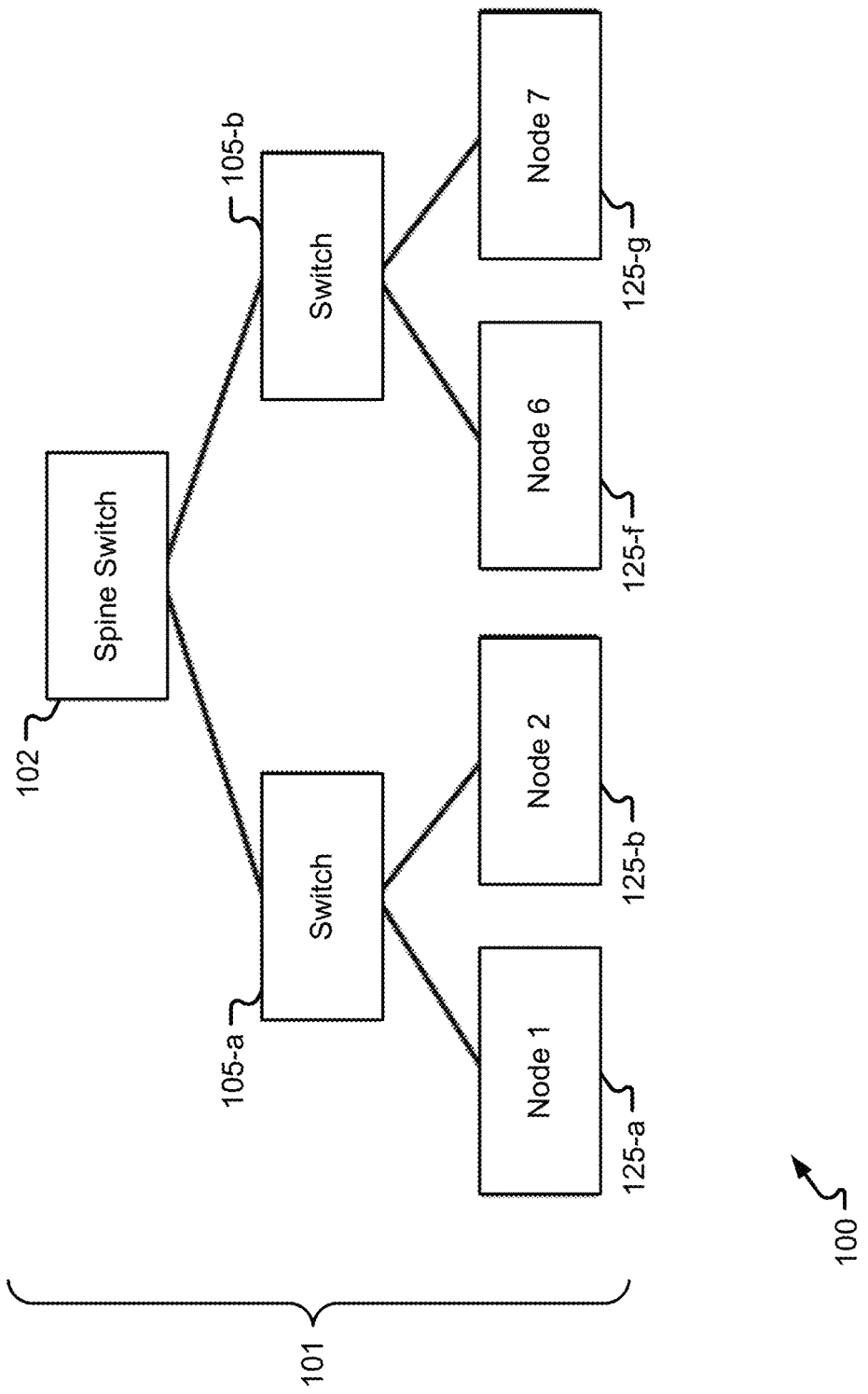
FIG. 2 illustrates an example implementation of the system described with reference to FIG. 1.

FIG. 2 illustrates an example implementation of the system 100 described with reference to FIG. 1. Repeated descriptions of like elements are omitted for brevity.

Referring to FIG. 2, the system 100 may include a network 101 supportive of running distributed applications over multiple nodes 125, and the computing nodes 125 are connected via a hierarchy of switching devices 105 (network switches). The switching devices 105 may be TOR switches as described herein.

In the example of FIG. 2, the network 101 may include a spine-leaf architecture (e.g., a data center network topology including two switching layers-a spine and leaf). The leaf layer may include access switches (e.g., switching devices 105) that aggregate traffic from servers (e.g., computing nodes 125) and connect directly into the spine or network core. Spine switch 102 may interconnect all leaf switches in a full-mesh topology.

In the example of FIG. 2, computing node 125-c through computing node 125-e are omitted for brevity, and it is to be understood that aspects of the present disclosure support a system 100 including any appropriate quantity of switching devices 105 and computing nodes 125.

In an example, SHARP related packets are sent from the computing nodes 125 to the switching devices 105. In some aspects, the switching devices 105 may include ALUs supportive of the techniques described herein. The network 101 may perform a collective primitive operation described herein, for example, by performing calculations inside the switching devices 105 (e.g., at an ALU or CU 110) and sending packets through the switch hierarchy. The network 101 (e.g., via switching devices 105 and computing nodes 125) may send packets up and down the switch hierarchy, until the collective operation result is received by the computing nodes 125.

Figure 3A:
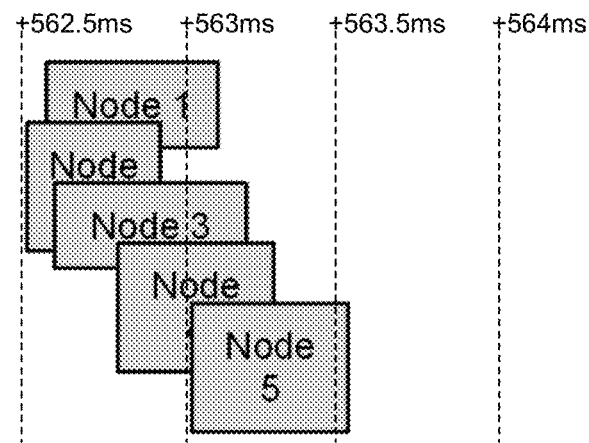
FIGS. 3A and 3B illustrate example graphical representations in accordance with aspects of the present disclosure.
Figure 3B:
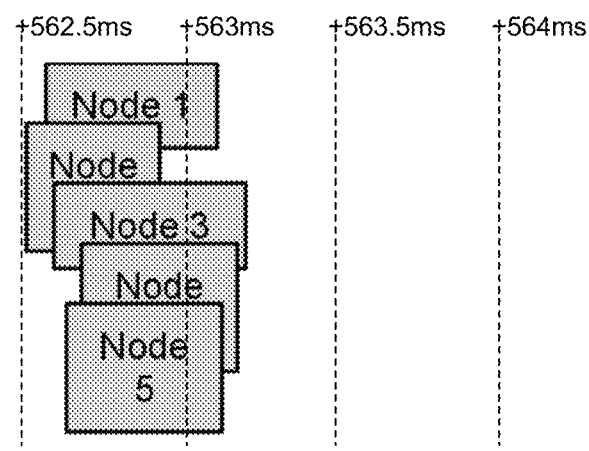

FIGS. 3A and 3B illustrate example graphical representations 300 and 301 in accordance with aspects of the present disclosure. The system 100 may support generating (e.g., by the tool 160 of FIG. 1) and displaying the graphical representations 300 and 301 at a user interface of a device, and the graphical representations 300 and 301 may display a collective operation timing associated with an application distributed among Node 1 through Node 5. In an example, the collective operation timing may be the timing of an AllReduce operation. In an example, Node 1 through Node 5 may be computing node 125-a through computing node 125-e described with reference to FIG. 1.

In an example implementation, the system 100 (e.g., by tool 160) may display, via the graphical representation 300 (and graphical representation 301), time ranges based on the transmission of one or more packets (e.g., respective first and last packets) sent by each of the computing nodes. For example, the time ranges may correspond to time stamps associated with the respective first and last packets as described herein. Additionally, or alternatively, the time ranges may be based on time stamps associated with when the one or more packets are received at a switching device (e.g., switching device 105-a) as described herein.

The system 100 may support displaying any suitable graphical shape (e.g., rectangular shapes, etc. on a timeline) representative of the time ranges. In the example graphical representation 300 of FIG. 3A, Node 4 and Node 5 are displayed as the "late nodes" among the nodes (e.g., Node 1 through Node 5) participating in the displayed collective operation. Referring to FIG. 3A, the operation time for competing the collective operation (e.g., AllReduce operation) is about 1 ms.

For example, from the graphical representations 300, a developer may determine that Node 4 and Node 5 are late (e.g., compared to Node 1 through Node 3) in providing data associated with AllReduce operation.

In an example, the developer may profile and optimize the code running on Nodes 4 and 5, and the system 100 may generate graphical representations 301 following the developer optimization of the code. Referring to FIG. 3B, the operation time for competing the collective operation (e.g., AllReduce operation) is about 0.6 ms.

Figure 4:
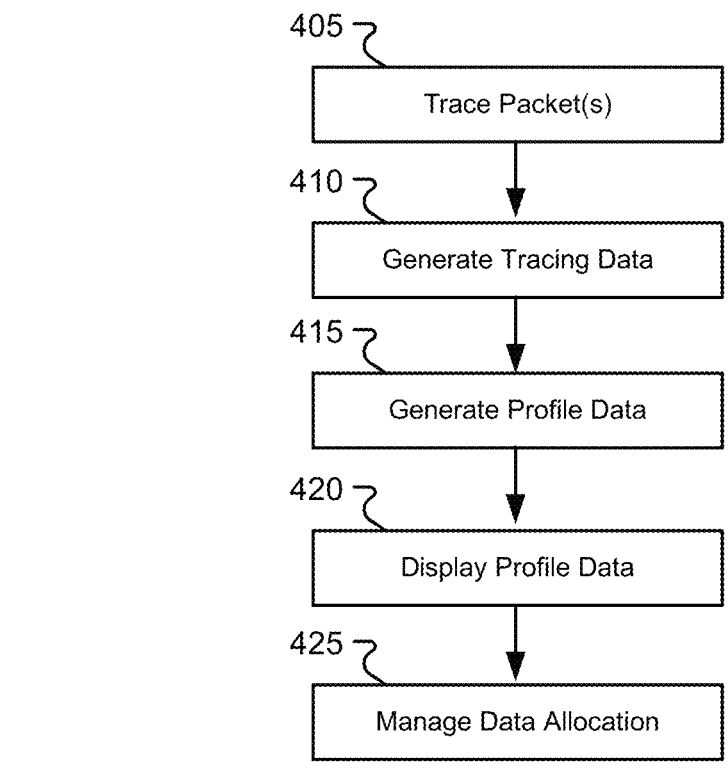
FIG. 4 illustrates an example of a process flow in accordance with aspects of the present disclosure.

FIG. 4 illustrates an example of a process flow 400 in accordance with aspects of the present disclosure. In some examples, process flow 400 may implement aspects of the system 100 described with reference to FIGS. 1 through 3.

In the following description of the process flow 400, the operations may be performed in a different order than the order shown, or the operations may be performed in different orders or at different times. Certain operations may also be left out of the process flow 400, or one or more operations may be repeated, or other operations may be added to the process flow 400.

It is to be understood that while example devices (e.g., switching device 105, a computing node 125, etc.) are described as performing a number of the operations of process flow 400, any appropriate device (e.g., another switching device 105 in communication with the device 105, another computing node 125, etc.) may perform the operations shown.

The process flow 400 may be implemented by a system including one or more processors to perform operations of the process flows. In an example, the system may be a distributed computing system including one or more switching devices and one or more computing nodes, and the one or more switching devices and/or the one or more computing nodes may include one or more processors to perform operations of the process flows.

In some aspects, the one or more processors may perform a collective operation in association with an application distributed among a plurality of computing nodes. In some aspects, the application trains a machine learning network.

At 405, the process flow 400 may include tracing one or more packets transmitted by the application distributed among the plurality of computing nodes. For example, the one or more packets are transmitted by the plurality of computing nodes.

At 410, the process flow 400 may include generating tracing data based on tracing the one or more packets, wherein the tracing data includes temporal information associated with transmission of the one or more packets.

In some aspects, the tracing data includes identification information associated with one or more computing nodes of the plurality of computing nodes.

In some aspects, the tracing data includes an indication of a primitive operation associated with the one or more packets. In some aspects, the primitive operation is included among a set of primitive operations associated with the application.

In some aspects, the temporal information includes collective temporal information associated with the application. In some aspects, the collective temporal information is based on: respective first packets transmitted by the plurality of computing nodes in association with the application (e.g., the first packet transmitted by the port of each computing node, in each collective operation); and respective last packets transmitted by the plurality of computing nodes in association with the application nodes (e.g., the second packet transmitted by the port of each computing node, in each collective operation).

In some aspects, the temporal information includes: a first temporal instance associated with a first packet transmitted by one or more computing nodes of the plurality of computing nodes; and a second temporal instance associated with a second packet transmitted by the one or more computing nodes, wherein the first packet and the second packet are included in the one or more packets.

In some aspects, the one or more packets include: a first packet transmitted by one or more computing nodes (e.g., by a port of the one or more computing nodes) of the plurality of computing nodes in association with a primitive operation, wherein the primitive operation is included among a set of primitive operations associated with the application; and a last packet transmitted by the one or more computing nodes (e.g., by the port of the one or more computing nodes) in association with the primitive operation.

At 415, the process flow 400 may include generating profile data associated with the application based on the tracing data.

At 420, the process flow 400 may include displaying profile data associated with the application via a graphical interface. In an example, displaying the profile data includes displaying: identification information corresponding to one or more computing nodes of the plurality of computing nodes; and a graphical representation corresponding to the temporal information associated with the transmission of the one or more packets.

At 425, the process flow 400 may include managing a data allocation associated with the application based on the tracing data. In some aspects, managing the data allocation is based on the profile data generated at 415.

In some aspects, managing the data allocation includes increasing, reducing, or maintaining an amount of data for processing by one or more computing nodes of the plurality of computing nodes in association with the application, based on the tracing data.

In an example, the temporal information includes first temporal information associated with transmission of one or more packets by a first computing node of the plurality of computing nodes and second temporal information associated with transmission of one or more second packets by at least one second computing node of the plurality of computing nodes. In some aspects, managing the data allocation includes reducing an amount of data for processing by the first computing node of the plurality of computing nodes in association with the application, based on a comparison of the first temporal information and the second temporal information.

For example, the process flow 400 may include identifying the "late nodes" and using the data to balance the workload between the computing nodes. In an example of balancing the workloads, the process flow 400 may include providing the "late nodes" a reduced amount of work associated with a distributed application, which may thereby prevent the "late nodes" from being late in further iterations.

Figure 5:
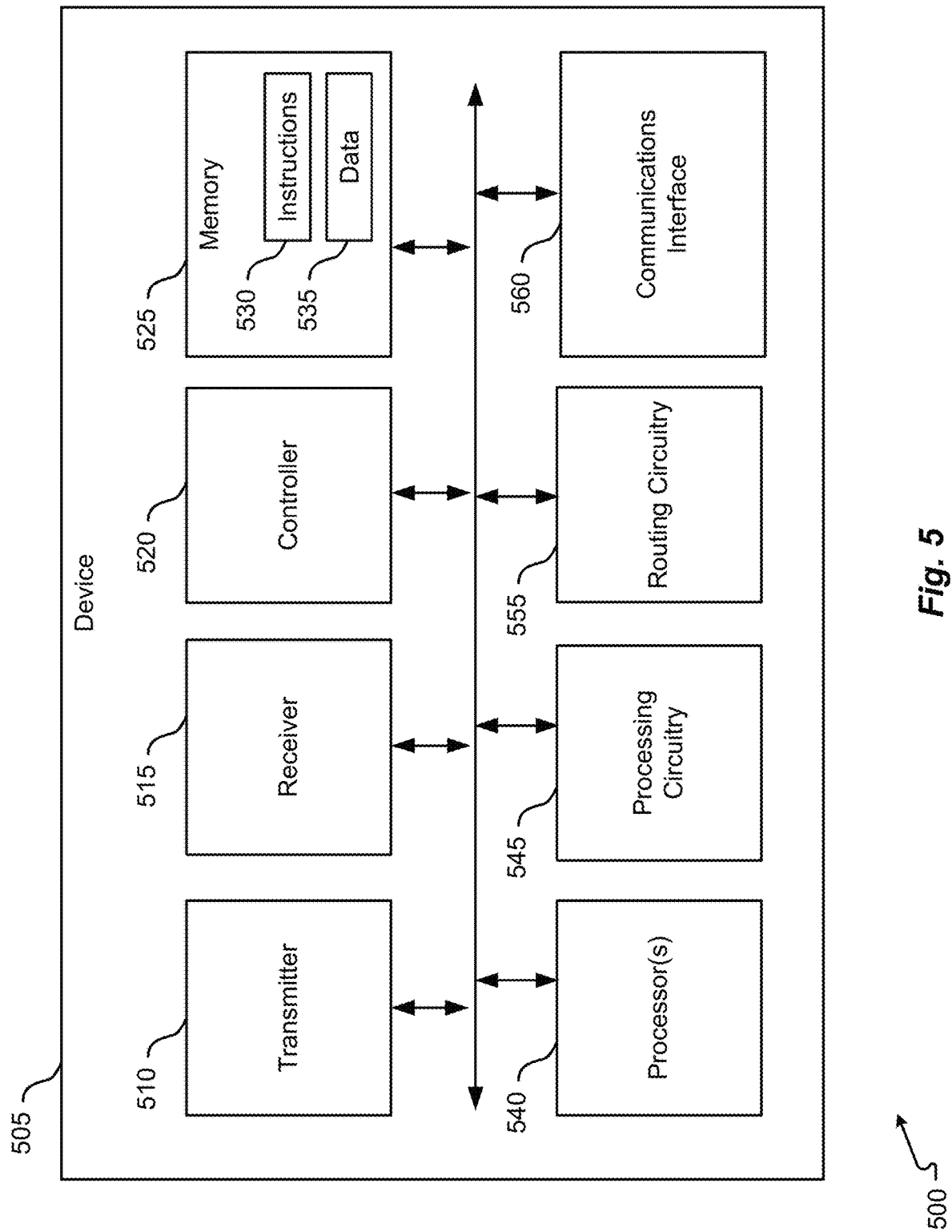
FIG. 5 illustrates an example of a system in accordance with aspects of the present disclosure.

FIG. 5 illustrates an example of a system 500 in accordance with aspects of the present disclosure. The system 500 may include a device 505. In some cases, the device 505 may be referred to as a computing resource. The device 505 may perform any or all of the operations described in the present disclosure. The device 505 may implement aspects of switching devices 105 or computing nodes 125 described herein.

The device 505 may include a transmitter 510, a receiver 515, a controller 520, a memory 525, a processor 540, processing circuitry 545, routing circuitry 555, and a communications interface 560. In some examples, components of the device 505 (e.g., transmitter 510, receiver 515, controller 520, memory 525, processor 540, processing circuitry 545, routing circuitry 555, communications interface 560, etc.) may communicate over a system bus (e.g., control busses, address busses, data busses, etc.) included in the device 505. It is to be understood that aspects of the present disclosure may support omitting any of the components of the device 505, including additional instances of the components of the device 505, or including additional components not illustrated in FIG. 5. For example, in the case of a switching device 105 (e.g., switching device 105-a) implemented by the device 505, one or more functions of the device 505 may be implemented by processing circuitry 545 and routing circuitry 555, without processor 540. In another example, in the case of a computing node 125 implemented by the device 505, one or more functions of the device 505 may be implemented by processing circuitry 545, without processor 540.

The transmitter 510 and the receiver 515 may support the transmission and reception of signals to and from the device 505. In some aspects, the transmitter 510 and the receiver 515 may support the transmission and reception of signals within the device 505. The transmitter 510 and receiver 515 may be collectively referred to as a transceiver. An antenna may be electrically coupled to the transceiver. The device 505 may also include (not shown) multiple transmitters 510, multiple receivers 515, multiple transceivers and/or multiple antennas.

The controller 520 may be located on a same chip (e.g., ASIC chip) as the transmitter 510 and/or the receiver 515. In some cases, the controller 520 may be located on a different chip as the transmitter 510 and/or the receiver 515. In some examples, the controller 520 may be located on a chip of or on a chip of another device 505. In some examples, the controller 520 may be a programmed microprocessor or microcontroller. In some aspects, the controller 520 may include one or more CPUs, memory, and programmable I/O peripherals. The controller 520 may control the routing circuitry 555 to route data according to the techniques described herein.

The memory 525 may be any electronic component capable of storing electronic information. The memory 525 may be, for example, random access memory (RAM), read-only memory (ROM), magnetic disk storage media, optical storage media, flash memory devices in RAM, on-board memory included with the processor, EPROM memory, EEPROM memory, registers, and so forth, including combinations thereof.

The memory 525 may include instructions 530 (computer readable code) and data 535 stored thereon. The instructions 530 may be executable by the processor 540 to implement the methods disclosed herein. In some aspects, execution of the instructions 530 may involve one or more portions of the data 550. In some examples, when the processor 540 executes the instructions 530, various portions of the instructions 530 and/or the data 535 may be loaded onto the processor 540.

The processor 540 may correspond to one or multiple computer processing devices. For example, the processor 540 may include a silicon chip, such as a Field Programmable Gate Array (FPGA), an ASIC, any other type of Integrated Circuit (IC) chip, a collection of IC chips, or the like. In some aspects, the processors may include a microprocessor, a Central Processing Unit (CPU), a Graphics Processing Unit (GPU), or plurality of microprocessors configured to execute instructions sets stored in a corresponding memory (e.g., memory 525 of the device 505). For example, upon executing the instruction sets stored in memory 525, the processor 540 may enable or perform one or more functions of the device 505. In some examples, a combination of processors 540 (e.g., an advanced reduced instruction set computer (RISC) machine (ARM) and a digital signal processor (DSP)) may be implemented in the device 505.

The processor 540 may support processing of computationally intensive workloads (e.g., artificial intelligence, deep learning, data science, etc.). For example, the processor 540 may utilize data stored in the memory 525 as a neural network. The neural network may include a machine learning architecture. In some aspects, the neural network may be or include an artificial neural network (ANN). In some other aspects, the neural network may be or include any machine learning network such as, for example, a deep learning network, a convolutional neural network, or the like. Some elements (e.g., data 535) stored in memory 525 may be described as or referred to as instructions or instruction sets, and some functions of the device 505 may be implemented using machine learning techniques.

The processing circuitry 545 may enable or perform one or more functions of the device 505. For example, the processing circuitry 545 may implement aspects of a switching device (e.g., a switching device 105), a computing nodes (e.g., a computing node 125), and components thereof described herein.

The routing circuitry 555 may implement aspects of a switching device (e.g., a switching device 105, a spine switch 102, etc.) described herein.

The communications interface 560 may support interactions (e.g., via a physical or virtual interface) between a user and the device 505.

Particular aspects of the subject matter described herein with reference to packet tracing, generating tracing data, managing data allocations, and providing a graphical representation of collective operation timing may be implemented to realize increased processing efficiency, increased utilization of computing resources, reduction of overall wait cost described herein, reduced processing overhead, reduced congestion, a reduction in "late nodes," and improved timing with respect to distributed applications (e.g., neural network training applications) performing a relatively large quantity of collective operations. Particular aspects of the subject matter described herein may be implemented to realize an interface supportive of improved profiling capabilities, as the interface may enable a developer to quickly identify and profile "late nodes" and "late network ports" in association with optimizing the performance of a distributed application.

Any of the steps, functions, and operations discussed herein can be performed continuously and automatically.

The exemplary apparatuses, systems, and methods of this disclosure have been described in relation to examples of system 100, switching devices 105, and computing nodes 125. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

It will be appreciated from the descriptions herein, and for reasons of computational efficiency, that the components of devices and systems described herein can be arranged at any appropriate location within a distributed network of components without impacting the operation of the device and/or system.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

While the flowcharts have been discussed and illustrated in relation to a particular sequence of events, it should be appreciated that changes, additions, and omissions to this sequence can occur without materially affecting the operation of the disclosed examples, configuration, and aspects.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more examples, configurations, or aspects for the purpose of streamlining the disclosure. The features of the examples, configurations, or aspects of the disclosure may be combined in alternate examples, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed example, configuration, or aspect. Thus, the following claims are hereby incorporated into this Detailed Description, with each claim standing on its own as a separate preferred example of the disclosure.

In at least one example, architecture and/or functionality of various previous figures are implemented in context of a general computer system, a circuit board system, a game console system dedicated for entertainment purposes, an application-specific system, and more. In at least one example, computing devices described herein may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

Other variations are within the spirit of present disclosure. Thus, while disclosed techniques are susceptible to various modifications and alternative constructions, certain illustrated examples thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed examples (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one example, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in an illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain examples require at least one of A, at least one of B and at least one of C each to be present. In addition, unless otherwise noted or contradicted by context, term "plurality" indicates a state of being plural (e.g., "a plurality of items" indicates multiple items). In at least one example, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one example, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one example, code is stored on a computer-readable storage medium, for example, in the form of a computer program comprising a plurality of instructions executable by one or more processors. In at least one example, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one example, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one example, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one example, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one example, different components of a computer system have separate processors and different processors execute different subsets of instructions.

Accordingly, in at least one example, computer systems are configured to implement one or more services that singly or collectively perform operations of processes described herein and such computer systems are configured with applicable hardware and/or software that enable performance of operations. Further, a computer system that implements at least one example of present disclosure is a single device and, in another example, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate examples of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one example, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one example, process of obtaining, acquiring, receiving, or inputting analog and digital data can be accomplished in a variety of ways such as by receiving data as a parameter of a function call or a call to an application programming interface. In at least one example, processes of obtaining, acquiring, receiving, or inputting analog or digital data can be accomplished by transferring data via a serial or parallel interface. In at least one example, processes of obtaining, acquiring, receiving, or inputting analog or digital data can be accomplished by transferring data via a computer network from providing entity to acquiring entity. In at least one example, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example implementations of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:
   a plurality of ports to connect to a plurality of computing nodes executing an application distributed across the plurality of computing nodes; and
   one or more processors connected to the plurality of ports and to:
   trace one or more packets transmitted by the plurality of computing nodes, wherein the one or more packets include a packet transmitted by one or more computing nodes of the plurality of computing nodes in association with a collective operation for the application;
   generate tracing data based on tracing the one or more packets, wherein the tracing data comprises temporal information associated with transmission of the one or more packets;
   identify one or more late computing nodes in the plurality of computing nodes based on the temporal information; and
   manage a data allocation associated with the application based on the one or more late computing nodes.

2. The system of claim 1, wherein the one or more processors are further to:
   generate profile data associated with the application based at least in part on the tracing data, wherein managing the data allocation is based at least in part on the profile data.

3. The system of claim 1, wherein the temporal information comprises collective temporal information associated with the collective operation for the application, wherein the collective temporal information is based at least in part on:
   respective first packets transmitted by the plurality of computing nodes in association with the collection operation for the application; and
   respective last packets transmitted by the plurality of computing nodes in association with the collection operation for the application.

4. The system of claim 1, wherein the one or more processors are further to display profile data associated with the application via a graphical interface, wherein displaying the profile data comprises displaying:
   identification information corresponding to the one or more computing nodes of the plurality of computing nodes; and
   a graphical representation corresponding to the temporal information associated with the transmission of the one or more packets.

5. The system of claim 1, wherein managing the data allocation comprises increasing, reducing, or maintaining an amount of data for processing by the one or more computing nodes of the plurality of computing nodes in association with the application, based at least in part on the tracing data.

6. The system of claim 1, wherein:
   the temporal information comprises first temporal information associated with transmission of one or more first packets by a first computing node of the plurality of computing nodes and second temporal information associated with transmission of one or more second packets by at least one second computing node of the plurality of computing nodes; and
   managing the data allocation comprises reducing an amount of data for processing by the first computing node of the plurality of computing nodes in association with the application, based at least in part on a comparison of the first temporal information and the second temporal information.

7. The system of claim 1, wherein the one or more packets comprise:
   a first packet transmitted by one or more computing nodes of the plurality of computing nodes in association with a primitive operation, wherein the primitive operation is comprised among a set of primitive operations associated with the application; and
   a last packet transmitted by the one or more computing nodes in association with the primitive operation.

8. The system of claim 1, wherein:
the tracing data comprises an indication of a primitive operation associated with the one or more packets; and
the primitive operation is comprised among a set of primitive operations associated with the application.

9. The system of claim 1, wherein the tracing data comprises identification information associated with the one or more computing nodes of the plurality of computing nodes.

10. The system of claim 1, wherein the one or more processors are to further perform the collective operation for the application.

11. The system of claim 1, wherein the application trains a machine learning network.

12. The system of claim 1, wherein the temporal information comprises:
a first temporal instance associated with a first packet transmitted by the one or more computing nodes of the plurality of computing nodes; and
a second temporal instance associated with a second packet transmitted by the one or more computing nodes,
wherein the first packet and the second packet are comprised in the one or more packets.

13. A distributed computing system comprising:
a switching device including a plurality of ports to connect to a plurality of computing nodes executing an application distributed across the plurality of computing nodes, wherein the switching device is to:
trace one or more packets transmitted the plurality of computing nodes, wherein the one or more packets include a packet transmitted by one or more computing nodes of the plurality of computing nodes in association with a collective operation for the application;
generate tracing data based on tracing the one or more packets, wherein the tracing data comprises temporal information associated with transmission of the one or more packets;
identify one or more late computing nodes in the plurality of computing nodes based on the temporal information; and
manage a data allocation associated with the application based on the one or more late computing nodes.

14. The distributed computing system of claim 13, wherein managing the data allocation is based at least in part on profile data associated with the application, wherein the profile data is generated based at least in part on the tracing data.

15. The distributed computing system of claim 13, wherein the temporal information comprises collective temporal information associated with the collective operation for the application, wherein the collective temporal information is based at least in part on:
respective first packets transmitted by the plurality of computing nodes in association with the collective operation for the application; and
respective last packets transmitted by the plurality of computing nodes in association with the collective operation for the application.

16. The distributed computing system of claim 13, wherein managing the data allocation comprises increasing, reducing, or maintaining an amount of data for processing by the one or more computing nodes of the plurality of computing nodes in association with the application, based at least in part on the tracing data.

17. The distributed computing system of claim 13, wherein the one or more packets comprise:
a first packet transmitted by one or more computing nodes of the plurality of computing nodes in association with a primitive operation, wherein the primitive operation is comprised among a set of primitive operations associated with the application; and
a last packet transmitted by the one or more computing nodes in association with the primitive operation.

18. The distributed computing system of claim 13, wherein:
the tracing data comprises an indication of a primitive operation associated with the one or more packets; and
the primitive operation is comprised among a set of primitive operations associated with the application.

19. The distributed computing system of claim 13, wherein the tracing data comprises identification information associated with the one or more computing nodes of the plurality of computing nodes.

20. A device comprising:
a plurality of ports to connect to a plurality of computing nodes executing an application distributed across the plurality of computing nodes; and
one or more processors connected to the plurality of ports and to:
trace, one or more packets transmitted by the plurality of computing nodes, wherein the one or more packets include a packet transmitted by one or more computing nodes of the plurality of computing nodes in association with a collective operation for the application;
generate tracing data based on tracing the one or more packets, wherein the tracing data comprises temporal information associated with transmission of the one or more packets;
identify one or more late computing nodes in the plurality of computing nodes based on the temporal information; and
manage a data allocation associated with the application based on the one or more late computing nodes.

* * * * *